June 5, 1934.  E. SCHUTTE ET AL  1,961,173
APPARATUS FOR DISPENSING PLASTIC PRODUCTS
Filed April 4, 1932
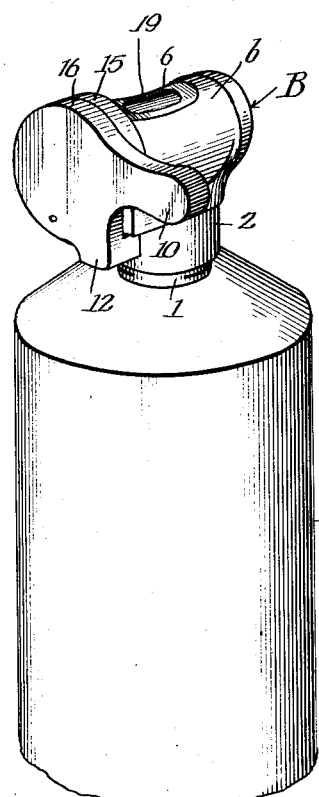
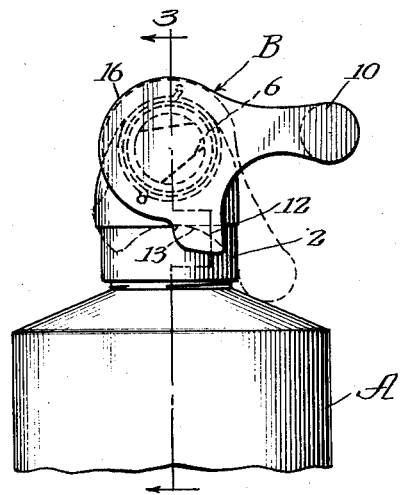
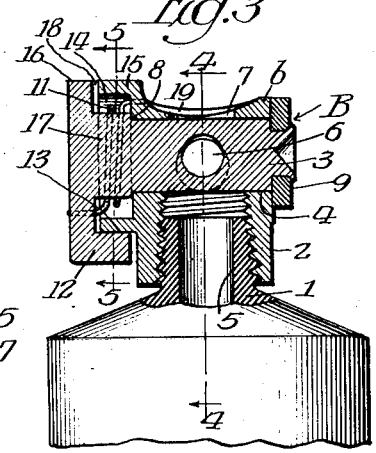
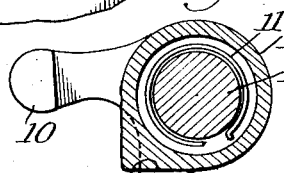
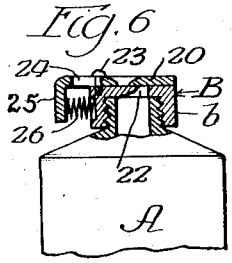
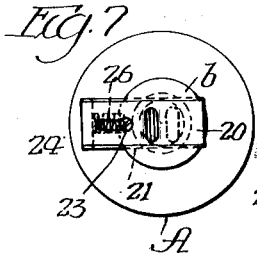
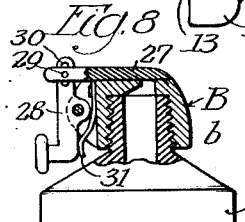
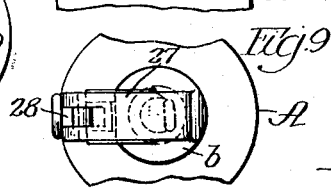
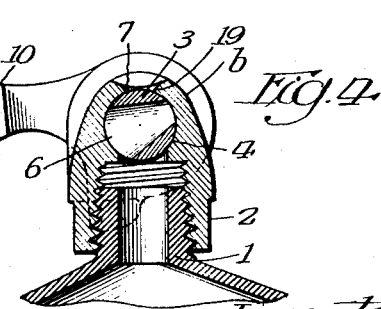
Inventors
ERNEST SCHUTTE and
OTTO BALZER
By Geo. E. Waldo, Atty Patented June 5, 1934

1,961,173

UNITED STATES PATENT OFFICE 1,961,173

APPARATUS FOR DISPENSING PLASTIC PRODUCTS

Ernest Schutte and Otto Balzer, Chicago, Ill.

Application April 4, 1932, Serial No. 603,020

3 Claims. (Cl. 221—60)

This invention relates to apparatus for dispensing plastic products, as tooth paste, shaving cream and the like, which are put up for sale and use in collapsible tubes or containers.

Objects of the invention are to provide a device for the purpose specified, adapted for dispensing measured quantities of a product, which will be simple in construction, relatively inexpensive to manufacture, effective for its designed purpose, and cleanly and sanitary as regards handling and use of the product.

To effect the objects thereof, a device embodying our invention and improvements comprises the various features, combinations of features and details of construction hereinafter described and claimed.

In the accompanying drawing, in which the invention is fully illustrated,

Fig. 1 is a perspective view showing a dispensing device embodying our invention and improvements as applied in use to a usual form of collapsible tube or container for plastic products.

Fig. 2 is a view of the parts shown in Fig. 1 from the left side of Fig. 3.

Fig. 3 is a view at right angles to Fig. 1, showing our improved dispensing device and the nipple of the container in section, substantially on the line 3—3 of Fig. 2.

Fig. 4 is a sectional view on the line 4—4 of Fig. 3.

Fig. 5 is a sectional view on the line 5—5 of Fig. 3.

Fig. 6 is a view substantially similar to Fig. 3 partly in section, showing a modified form of dispensing valve.

Fig. 7 is a top-plan view thereof.

Fig. 8 is a view substantially similar to Fig. 6, showing another modification of the dispensing valve; and Fig. 9 is a top-plan view thereof.

Describing the invention with reference to the drawing and referring in the first instance to Figs. 1 to 5, inclusive, A designates as a whole, a collapsible tube or container such as is commonly used for putting up tooth paste, shaving cream and other plastic products for shipment and sale, and B designates as a whole, what we now consider a preferable form of valve for dispensing the contents of said tube or container.

As shown, the tube or container A is of a usual type, being made of non-resilient metal, having a hollow, exteriorly threaded nipple 1 at its discharge end, and the dispensing device or valve B may be described, generally, as a valve comprising a casing $b$ formed on which is a hollow boss 2, which is interiorly screw-threaded, as shown, for engagement with the nipple 1 of the tube or container A.

What we now consider a preferable form of dispensing valve B is a usual form of stop-cock, comprising a plug 3 fitted to turn in a seat 4 formed in the valve casing, with its axis disposed substantially at right angles to the discharge opening 5 of the nipple 1, formed in which is a discharge opening 6, which extends at right angles to the axis of said plug and which is adapted for connecting the discharge opening 5 in the nipple 1 with the discharge opening 7 of the valve casing.

As shown, the valve plug 3 is secured against endwise movement in its seat 4 by means of a shoulder 8 formed thereon adapted to bear against a faced surface formed at one end of the valve seat 4 and a washer 9 secured to the end of said valve plug which projects through the valve seat 4.

The valve plug 3 is adapted to be maintained yieldingly in position to close the discharge opening in the nipple 1, that is, in position in which the valve plug will close the valve opening 7, as shown in Fig. 4, closed position of said valve being defined by a suitable stop, as presently described.

As shown, the valve plug 3 is adapted to be turned in different directions by means of a lever arm 10 formed thereon, being maintained yieldingly in position to close the discharge opening in the container nipple 1 by a coil spring 11, one end of which is secured to the valve casing $b$ and the other end to the operating arm 10 and which surrounds the projecting end of said plug as a guide, closed position of said valve being defined by contact of a laterally projecting lug 12 formed on said lever arm with a rigid part of the valve casing, as shown at 13. To open the valve, the valve plug 3 may be turned manually against the force of the spring 11 by means of the operating arm 10.

In the preferable construction shown, the spring 11 is enclosed in a recess 14 formed in a flange 15 on the valve casing, the open side of which is closed by a corresponding flange 16 on the valve plug 3, the enlarged portion 17 of the plug defined by the shoulder 8 being of such length that the adjacent faces of the flanges will be separated by an appreciable space as shown at 18, thus providing for washing out the cavity 14 in case plastic material becomes lodged therein.

The discharge opening 7 in the valve casing is appreciably longer axially of the valve seat than it is circumferentially thereof, being so proportioned that the plastic product in the container will be discharged therefrom in the form of a ribbon of desired width and thickness.

In the preferable construction shown, also, the valve casing $b$ is trimmed or cut away around the discharge opening 7 thereof so that it will be relatively thin and sharp, as shown at 19, thus providing for conveniently removing any plastic product from the recess formed at the outer end of the discharge opening 7 when the valve plug is in closed position, while the sharp edge of said opening will operate to sever the ribbon of material protruding from said opening when the valve is released after having been open, and is closed by the spring 11.

A particular advantage of our invention is that by the use of our improved dispensing device or apparatus, the container A may be held and subjected to pressure to collapse the same to expel plastic product therefrom, and the operating arm 10 manipulated, using one hand only, the other hand being free to hold a tooth brush or the like to receive tooth paste or other plastic product discharged from the container A.

As a modification of our invention, we contemplate a construction in which, instead of a rotatable valve plug for controlling the discharge opening in the container nipple 1, said discharge opening is controlled by means of a plate provided with a discharge opening adapted to communicate with the discharge opening in the valve casing and which is slidably fitted to a groove in the outer end of the valve casing, said slide preferably being dovetailed into the valve casing. Movement of said slide is limited by means of a stop pin which engages a slot in said slide and said slide is maintained yieldingly at the limit of its movement corresponding to closed position of said valve by means of a spring, opposite ends of which are confined in shallow recesses formed in the operating handle of said slide and in the valve casing, respectively.

This modification is shown in Figs. 6 and 7, of the drawing, in which A designates the tube or container as a whole, B the valve as a whole, $b$ the valve casing, 20 the movable valve member, 21 the groove to which said member is slidably fitted, 22 the discharge opening in the valve, 23 the stop pin which limits movement of said valve, 24 the slot in the valve engaged by said pin, 25 the operating handle of the valve, and 26 the spring mounted to react between said handle and a seat on the valve casing and adapted to maintain the valve yieldingly closed.

As a further modification, I have shown a construction in which the discharge opening of the valve is controlled by a movable valve member in the form of a slide fitted to a groove formed in the valve casing so as to be movable endwise therein to open and close the valve, said valve member being maintained yieldingly in position to close the valve by means of a leaf spring applied thereto and being movable endwise against the force of said spring to open said valve, by a manually operable lever pivoted on the valve casing, the relation being such, preferably, that when the valve is closed, the end of the slide will cover the discharge opening of the container and such also, that when the valve is open, the end of the valve slide will be at one side of the discharge opening of the container. Preferably, also, the free end of the valve slide is sharpened so that when moved from open to closed position, it will sever a ribbon of material protruding from the discharge opening of the container.

This modification is shown in Figs. 8 and 9 of the drawing, in which, as before, A designates the collapsible tube or container as a whole, B the control valve as a whole, $b$ the valve casing, 27 the movable valve member slidably mounted in the groove formed in the end of the valve casing, 28 a pivoted lever adapted for manual operation, an end of which is operatively connected with the movable valve member by means of a pin 29 secured in said valve member, which engages a slot 30 formed in said manually operable lever, and 31 a spring applied to said lever adapted to maintain the valve yieldingly closed.

We claim:

1. In combination, a collapsible container for plastic products provided with a discharge opening, a closure therefor comprising a casing on said container provided with a cylindrical seat, a plug rotatable in said seat provided with a passageway for plastic product arranged to communicate with the discharge opening of the container, a stop which defines closed position of said plug, an arm integral with said plug for turning the same, a coil spring applied to said plug for maintaining the same yieldingly closed, and a housing for said coil spring consisting of opposed flanges on the valve casing and operating arm, respectively, one of which is provided with a recess in which said spring is positioned, and the other of which closes the open side of said recess, the relation being such that the container may simultaneously be held and collapsed and the valve plug manipulated using one hand only.

2. The container specified in claim 1, which also comprises means for defining a space between the opposed faces of the flanges on the valve casing and plug, respectively.

3. The container specified in claim 1, which also comprises means for defining a space between the opposed faces of the flanges on the valve casing and plug, respectively, consisting of a spacing shoulder on the plug which is longer than the depth of the recess forming the housing for the spring applied to said plug for closing the same.

ERNEST SCHUTTE.
OTTO BALZER.